(12) United States Patent
Horikawa et al.

(10) Patent No.: US 9,158,360 B2
(45) Date of Patent: Oct. 13, 2015

(54) ELECTRONIC APPARATUS

(75) Inventors: Seiichiro Horikawa, Kanagawa (JP); Koji Akita, Kanagawa (JP); Hideo Kasami, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 132 days.

(21) Appl. No.: 13/418,562

(22) Filed: Mar. 13, 2012

(65) Prior Publication Data

US 2013/0015913 A1    Jan. 17, 2013

(30) Foreign Application Priority Data

Jul. 11, 2011 (JP) ................. 2011-153029

(51) Int. Cl.
*H04B 1/38* (2015.01)
*G06F 1/32* (2006.01)

(52) U.S. Cl.
CPC ............ *G06F 1/3212* (2013.01); *G06F 1/3296* (2013.01); *Y02B 60/1285* (2013.01); *Y02B 60/1292* (2013.01)

(58) Field of Classification Search
CPC ............................. G06F 1/3212; G06F 1/3296
USPC .......... 455/558; 713/340; 320/128; 345/204; 726/19; 327/288
See application file for complete search history.

(56) References Cited

U.S. PATENT DOCUMENTS

| | | | |
|---|---|---|---|
| 5,712,472 A | 1/1998 | Lee | |
| 6,297,813 B1 * | 10/2001 | Okada et al. | 345/204 |
| 2005/0231921 A1 | 10/2005 | Noda et al. | |
| 2008/0073436 A1 * | 3/2008 | Nishizawa et al. | |
| 2009/0058361 A1 * | 3/2009 | John | 320/128 |
| 2010/0109735 A1 * | 5/2010 | Lee | 327/288 |
| 2010/0115611 A1 * | 5/2010 | Morihara | 726/19 |
| 2010/0241890 A1 * | 9/2010 | Goodart et al. | 713/340 |
| 2011/0148212 A1 * | 6/2011 | Kotani | 307/80 |
| 2011/0270999 A1 | 11/2011 | Marseille et al. | |
| 2011/0279244 A1 * | 11/2011 | Park et al. | 340/10.34 |

FOREIGN PATENT DOCUMENTS

| | | |
|---|---|---|
| JP | 08263607 A | 10/1996 |
| JP | 2005084935 A | 3/2005 |
| JP | 2005527049 A | 9/2005 |

(Continued)

OTHER PUBLICATIONS

Japanese Office Action dated Aug. 26, 2014, issued in counterpart Japanese Application No. 2011-153029.

*Primary Examiner* — Wesley Kim
*Assistant Examiner* — Raj Chakraborty
(74) *Attorney, Agent, or Firm* — Holtz, Holtz, Goodman & Chick PC

(57) ABSTRACT

In an embodiment, an electronic apparatus is mounted with a card unit including first and second devices driven with different driving voltages. The electronic apparatus includes: first and second voltage generating units, first and second control units. The first voltage generating unit generates a first driving voltage for driving the first device and a second driving voltage for driving the second device using electric power from the battery. The second voltage generating unit generates the first driving voltage and second driving voltage using electric power transmitted from the external device. The first control unit controls the first selection unit such that any one of the first driving voltage generated by the first voltage generating unit and the first driving voltage generated by the second voltage generating unit is selected depending on the electric power supply capability of the battery.

8 Claims, 2 Drawing Sheets

(56) References Cited

FOREIGN PATENT DOCUMENTS

| | | |
|---|---|---|
| JP | 2005-293516 A | 10/2005 |
| JP | 2009094883 A | 4/2009 |
| JP | 2011-028433 A | 2/2011 |
| WO | WO 2010/026063 A1 | 3/2010 |

* cited by examiner

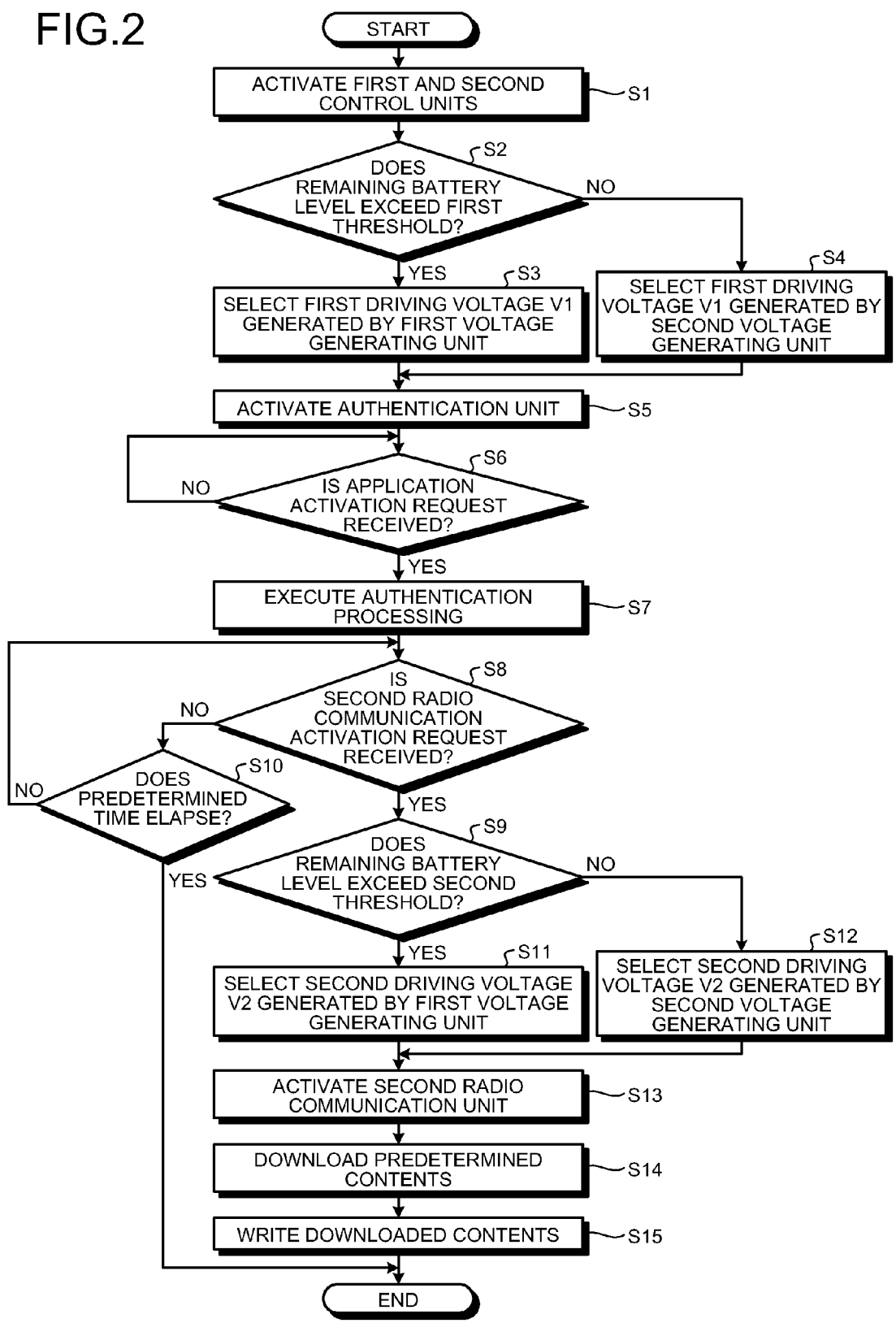

ELECTRONIC APPARATUS

CROSS-REFERENCE TO RELATED APPLICATIONS

This application is based upon and claims the benefit of priority from Japanese Patent Application No. 2011-153029, filed on Jul. 11, 2011; the entire contents of which are incorporated herein by reference.

FIELD

Embodiments described herein relate generally to an electronic apparatus.

BACKGROUND

In the related art, there is known an electronic apparatus (such as a mobile phone terminal) where a card unit (such as a SIM card) obtained by installing various devices on a substrate can be mounted. Such an electronic apparatus is driven by electric power from a battery. In addition, the electric power from the battery is also supplied to the card unit mounted on the electronic apparatus.

However, there is a problem in that it is difficult to drive the devices installed in the card unit when an electric power supply capability of the battery becomes lower than a predetermined value (for example, when a remaining battery level is lower than a predetermined value and the like).

BRIEF DESCRIPTION OF THE DRAWINGS

FIG. 2 is a flow chart illustrating an operational example of the communication system.

DETAILED DESCRIPTION

Figure 1:
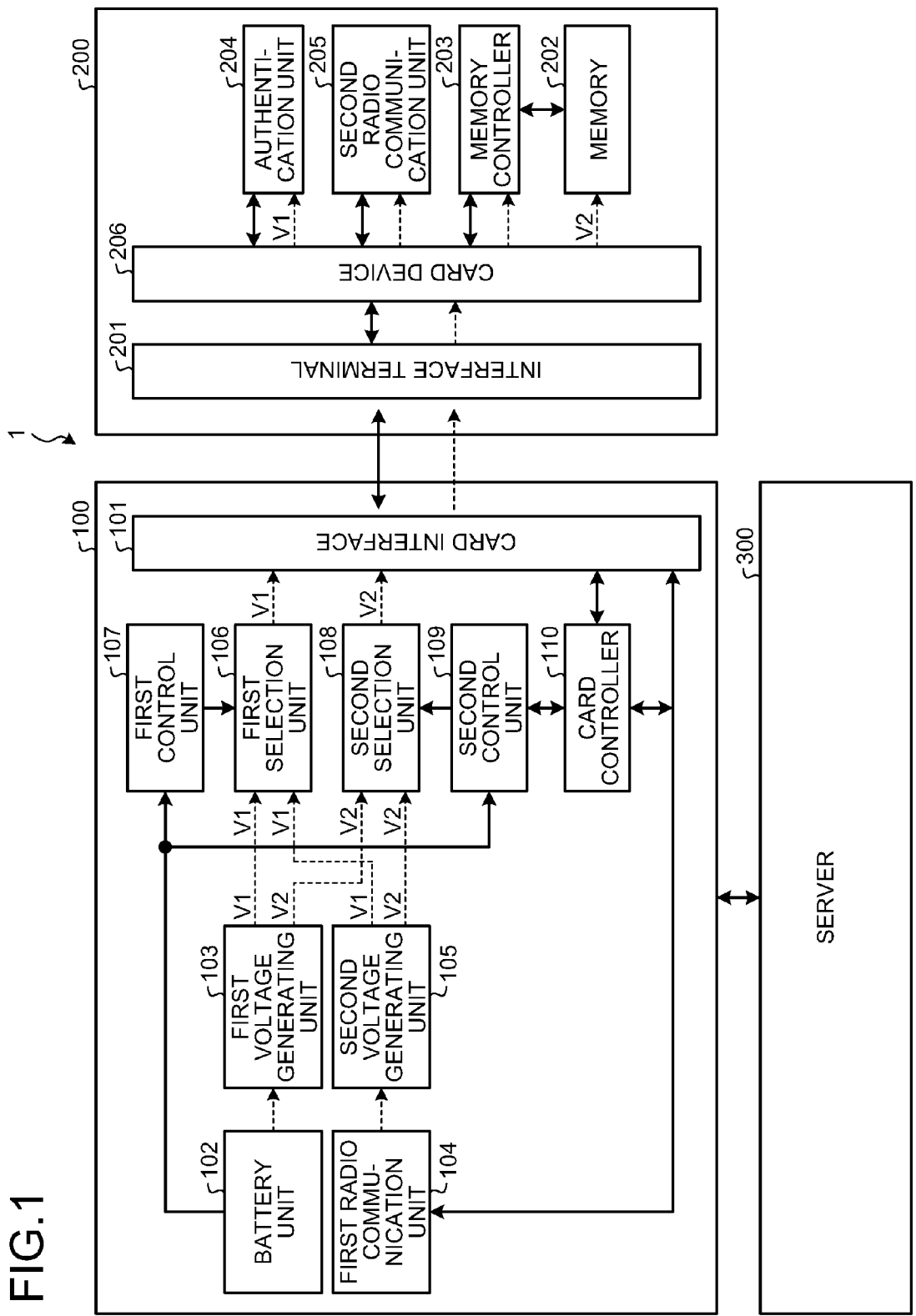
FIG. 1 is a diagram illustrating a schematic configuration example of a communication system according to an embodiment.

In an embodiment, an electronic apparatus is mounted with a card unit including first and second devices driven with different driving voltages. The electronic apparatus includes: a radio communication unit configured to perform radio communication with an external device and to receive electric power from the external device; a battery; a first voltage generating unit configured to generate a first driving voltage for driving the first device and a second driving voltage for driving the second device using electric power from the battery; a second voltage generating unit configured to generate the first and second driving voltages using electric power from the external device; a first selection unit configured to select any one of the first driving voltage generated by the first voltage generating unit and the first driving voltage generated by the second voltage generating unit; a second selection unit configured to select any one of the second driving voltage generated by the first voltage generating unit and the second driving voltage generated by the second voltage generating unit; a first control unit configured to control the first selection unit such that any one of the first driving voltage generated by the first voltage generating unit and the first driving voltage generated by the second voltage generating unit is selected depending on the electric power supply capability of the battery; and a second control unit configured to control the second selection unit such that any one of the second driving voltage generated by the first voltage generating unit and the second driving voltage generated by second voltage generating unit is selected depending on the electric power supply capability of the battery.

Hereinafter, an electronic apparatus according to an embodiment will be described in detail with reference to the accompanying drawings. FIG. 1 is a block diagram illustrating a schematic configuration example of a communication system 1 according to an embodiment. As illustrated in FIG. 1, the communication system 1 includes an electronic apparatus 100 where a card unit 200 can be mounted and a server 300. For example, the electronic apparatus 100 may include a portable terminal such as a smart phone.

First, details of each unit included in the electronic apparatus 100 will be described. The electronic apparatus 100 includes a card interface 101, a battery unit 102, a first voltage generating unit 103, a first radio communication unit 104, a second voltage generating unit 105, a first selection unit 106, a first control unit 107, a second selection unit 108, a second control unit 109, and a card controller 110.

The card interface 101 is an interface device configured to connect the electronic apparatus 100 and the card unit 200.

The first voltage generating unit 103 generates two types of driving voltages (including first and second driving voltages V1 and V2) for driving various devices mounted on the card unit 200 using the electric power from the battery unit 102. Here, for example, a voltage value of the first driving voltage V1 is assumed to be lower than a voltage value of the second driving voltage V2, which however is not limited thereto. For example, each voltage value of the first and the second driving voltages V1 and V2 may be set arbitrarily. For example, the first voltage generating unit 103 may include a regulator and the like.

The first radio communication unit 104 performs radio communication with the server 300 and to receive electric power from the server 300. Although a detailed illustration is not provided, the first radio communication unit 104 includes an electronic circuit, an antenna, and the like configured to perform the radio communication. In addition, electric power is transmitted from the server 300 to the first radio communication unit 104. For example, according to the present embodiment, the electric power is transmitted to the first radio communication unit 104 from the server 300 based on an electromagnetic induction technique. More specifically, the first radio communication unit 104 includes a coil, and the server 300 includes a coil supplied with an alternating current. When the electronic apparatus 100 approaches the server 300, the electric power (electric current) is generated in the coil of the first radio communication unit 104 due to the electromagnetic induction. In addition, according to the present embodiment, information (transmitted data) is expressed using a part (about 10%, for example) of the transmitted electric power value (in this case, the value of current), and the electronic apparatus 100 can detect the data transmitted from the server 300 by detecting the value of current generated in the coil of the first radio communication unit 104.

The second voltage generating unit 105 generates the first and second driving voltages V1 and V2 using the electric power transmitted to the first radio communication unit 104 from the server 300. Similarly to the first voltage generating unit 103, the second voltage generating unit 105 may include, for example, a regulator and the like.

The first selection unit 106 selects any one of the first driving voltage V1 generated by the first voltage generating unit 103 and the first driving voltage V1 generated by the second voltage generating unit 105 under control of the first control unit 107. The first selection unit 106 may include, for example, a switch, a relay, or the like.

The first control unit 107 controls the first selection unit 106 such that any one of the first driving voltage V1 generated by the first voltage generating unit 103 and the first driving voltage V1 generated by the second voltage generating unit 105 is selected depending on the electric power supply capability of the battery unit 102. The first driving voltage V1 selected by the first selection unit 106 is supplied to the card unit 200 through the card interface 101. For example, when a total amount of charges remaining in the battery unit 102 (hereinafter, referred to as a "remaining battery level") exceeds a first threshold, the first control unit 107 according to the present embodiment controls the first selection unit 106 such that the first driving voltage V1 generated by the first voltage generating unit 103 is selected. In addition, when the remaining battery level is lower than the first threshold, the first control unit 107 controls the first selection unit 106 such that the first driving voltage V1 generated by the second voltage generating unit 105 is selected. In addition, the first threshold may be determined arbitrarily.

Under control of the second control unit 109, the second selection unit 108 selects any one of the second driving voltage V2 generated by the first voltage generating unit 103 and the second driving voltage V2 generated by the second voltage generating unit 105. For example, the second selection unit 108 may include a switch, a relay, or the like.

The second control unit 109 controls the second selection unit 108 such that any one of the second driving voltage V2 generated by the first voltage generating unit 103 and the second driving voltage V2 generated by the second voltage generating unit 105 is selected depending on the electric power supply capability of the battery unit 102. The second driving voltage V2 selected by the second selection unit 108 is applied to the card unit 200 through the card interface 101. For example, when the remaining battery level exceeds a second threshold, the second control unit 109 according to the present embodiment controls the second selection unit 108 such that the second driving voltage V2 generated by the first voltage generating unit 103 is selected. In addition, when the remaining battery level is equal to or lower than the second threshold, the second control unit 109 controls the second selection unit 108 such that the second driving voltage V2 generated by the second voltage generating unit 105 is selected. In addition, the second threshold may be determined arbitrarily. The second threshold may be different from or equal to the first threshold described above.

The card controller 110 controls the card unit 200 through the card interface 101.

Next, each part included in the card unit 200 will be described in detail. The card unit 200 is an apparatus provided with various devices on the substrate. The card unit 200 includes an interface terminal 201, a memory 202, a memory controller 203, an authentication unit 204, a second radio communication unit 205, and a card device 206.

The interface terminal 201 can be electrically connected to the card interface 101. Under control of the card controller 110, the card device 206 controls the entire card unit 200.

The memory 202 stores the various kinds of data. For example, the memory 202 may include a nonvolatile memory. According to the present embodiment, the driving voltage for driving the memory 202 is the second driving voltage V2, and the memory 202 corresponds to the "second device." The memory controller 203 controls the memory 202 under control of the card device 206. The memory controller 203 controls, for example, reading data stored in the memory 202, or writing data on the memory 202. According to the present embodiment, the voltage for driving the memory controller 203 may be either the first or second driving voltage V1 or V2.

The authentication unit 204 performs authentication processing with the server 300 through the radio communication using the first radio communication unit 104 of the electronic apparatus 100. For example, the authentication unit 204 may include a secure element. The "authentication processing" described above refers to processing for authenticating the card unit 200. According to the present embodiment, for example, the card unit 200 is authenticated by determining whether or not an identification number assigned to the card unit 200 is equal to the identification number registered in advance. The authentication unit 204 stores the identification numbers and various application programs. The application program may include, for example, a program for downloading predetermined contents stored in the server 300 (such as music or documents). However, the embodiment is not limited thereto, and any type of application program may be employed. In addition, according to the present embodiment, the voltage for driving the authentication unit 204 is the first driving voltage V1, and the authentication unit 204 corresponds to the "first device."

The second radio communication unit 205 performs radio communication with the server 300. Although a detailed illustration is not provided, the second radio communication unit 205 includes an antenna, an electronic circuit, and the like configured to perform the radio communication. According to the present embodiment, since the radio communication of the second radio communication unit 205 is used to download contents from the server 300, a data transmission rate of the second radio communication unit 205 is set to a value greater than that of the first radio communication unit 104 in the electronic apparatus 100 side. In addition, according to the present embodiment, the voltage for driving the second radio communication unit 205 may be either the first or second driving voltage V1 or V2.

Next, an operational example of the communication system 1 according to the present embodiment will be described with reference to FIG. 2. Here, assume a scene where a service for downloading predetermined contents from the server 300 after the authentication processing is provided. First, a user who receives a service causes the electronic apparatus 100 in hand to approach the server 300. As a result, the electric power is generated in the coil of the first radio communication unit 104, and the first and second control units 107 and 109 are activated by receiving the electric power (step S1). More specifically, using the electric power generated in the coil, the second voltage generating unit 105 generates the first and second driving voltages V1 and V2, and any one of the first and second driving voltages V1 and V2 is supplied to the first and second control units 107 and 109 so as to activate the first and second control units 107 and 109. However, the embodiment is not limited thereto. For example, when the electric power is generated in the coil of the first radio communication unit 104, the electric power may start to be supplied from the battery unit 102 to the first and second control units 107 and 109.

Then, the first control unit 107 determines whether or not the remaining battery level exceeds the first threshold (step S2). When it is determined that the remaining battery level exceeds the first threshold (YES in step S2), the first control unit 107 controls the first selection unit 106 such that the first driving voltage V1 generated by the first voltage generating unit 103 is selected (step S3). When it is determined that the remaining battery level is equal to or smaller than the first threshold (NO in step S2), the first control unit 107 controls the first selection unit 106 such that the first driving voltage V1 generated by the second voltage generating unit 105 is selected (step S4). The first driving voltage V1 selected by the first selection unit 106 is supplied to the authentication unit 204 through the card interface 101, and the authentication unit 204 is activated (step S5).

Then, when the first radio communication unit 104 receives an application activation request for requesting activation of an application corresponding to the service provided from the server 300 (YES in step S6), the application requested by the server 300 is executed out of a plurality of types of applications stored in the authentication unit 204. After activation of the application, the authentication processing is executed (step S7). More specifically, first, the authentication unit 204 transmits the aforementioned identification number to the server 300 through the first radio communication unit 104, for example, after encryption. The server 300 decrypts the identification number transmitted from the electronic apparatus 100, and authentication is performed by determining whether or not the identification number obtained through decryption matches the identification number registered in advance. This is just an example, and various techniques known in the art may be employed for the authentication processing performed between the authentication unit 204 and the server 300.

Then, when the first radio communication unit 104 receives the second radio communication unit activation request for requesting activation of the second radio communication unit 205 from the server 300 (YES in step S8), the instruction signal for instructing activation of the second radio communication unit 205 is transmitted to the card controller 110 from the host controller (not illustrated) connected to the first radio communication unit 104. The card controller 110 transmits the instruction signal to the second control unit 109, and the second control unit 109 receiving the instruction signal determines whether or not the remaining battery level exceeds the second threshold (step S9). Meanwhile, when the second radio communication unit activation request is not received within a predetermined period (YES in step S10), the process is terminated.

In step S9 described above, when it is determined that the remaining battery level exceeds the second threshold (YES in step S9), the second control unit 109 controls the second selection unit 108 such that the second driving voltage V2 generated by the first voltage generating unit 103 is selected (step S11). In addition, in step S9 described above, when it is determined that the remaining battery level is equal to or lower than the second threshold (NO in step S9), the second control unit 109 controls the second selection unit 108 such that the second driving voltage V2 generated by the second voltage generating unit 105 is selected (step S12). The second driving voltage V2 selected by the second selection unit 108 is supplied to the second radio communication unit 205 through the card interface 101 and activates the second radio communication unit 205 (step S13).

Then, the card controller 110 initiates radio communication with the server 300 and controls the second radio communication unit 205 such that a predetermined content is downloaded (step S14). In addition, under control of the card device 206, the memory controller 203 writes the downloaded content to the memory 202 (step S15). As a result, the service is terminated.

As described above, according to the present embodiment, various devices mounted on the card unit 200 (such as the memory 202 and the authentication unit 204) are driven using two types of driving voltages (including first and second driving voltages V1 and V2). In addition, when the electronic apparatus 100 according to the present embodiment supplies the first driving voltage V1 to the card unit 200, the first driving voltage V1 generated using the electric power transmitted to the first radio communication unit 104 from the server 300 is supplied to the card unit 200 when the remaining battery level is equal to or lower than the first threshold. In addition, when the electronic apparatus 100 supplies the second driving voltage V2 to the card unit 200, the second driving voltage V2 generated using the electric power transmitted to the first radio communication unit 104 from the server 300 is supplied to the card unit 200 when the remaining battery level is equal to or lower than the second threshold. That is, according to the present embodiment, even when the electric power supply capability of the battery unit 102 is insufficient, it is possible to drive various devices mounted on the card unit 200 using the electric power transmitted to the first radio communication unit 104 from the server 300.

For example, any type of the card unit 200 may be employed, such as an SD card, a micro SD card, a SIM card, and an IC card.

Although the electric power is transmitted to the first radio communication unit 104 from the server 300 based on an electric induction technique according to the embodiments described above, the embodiment is not limited thereto. Any technique may be employed to wirelessly transmit the electric power from the server 300 to the first radio communication unit 104. For example, the electric power may be transmitted to the first radio communication unit 104 from the server 300 in an electric wave form. In this case, any type of antenna of the first radio communication unit 104 may be employed. For example, the first radio communication unit 104 may include a near field communication (NFC) antenna or a 3G antenna.

In addition, although the electronic apparatus 100 generates two types of driving voltages and supplies them to the card unit 200 according to the embodiment described above, any number or any type of driving voltages generated by the electronic apparatus 100 may be employed. For example, the electronic apparatus 100 may generate three or more types of driving voltages and may supply them to the card unit 200. Alternatively, the electronic apparatus 100 may generate a single type of driving voltage and may supply it to the card unit 200. In short, the electronic apparatus according to the embodiment is an electronic apparatus where a unit including a device (for example, the card unit 200) driven using a predetermined driving voltage can be mounted. When the power supply capability of a battery (the battery unit 102) is insufficient, the driving voltage generated using the electric power transmitted to the first radio communication from an external device (for example, the server 300) may be supplied to the mounted units.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus on which a card is mounted, the card including first and second devices which are drivable with different driving voltages, the electronic apparatus comprising:

an electronic circuit configured to perform radio communication with an external device via an antenna and to wirelessly receive electric power from the external device;

a battery;

a first voltage regulator configured to generate a first driving voltage for driving the first device of the card unit and a second driving voltage for driving the second device of the card unit using electric power from the battery;

a second voltage regulator configured to generate the first driving voltage and the second driving voltage using electric power received wirelessly from the external device by the electronic circuit;

a first switch configured to select any one of the first driving voltage generated by the first voltage regulator and the first driving voltage generated by the second voltage regulator;

a second switch configured to select any one of the second driving voltage generated by the first voltage regulator and the second driving voltage generated by the second voltage regulator;

a first controller configured to control the first switch (i) such that the first driving voltage generated by the first voltage regulator is selected when an electric power supply capability of the battery exceeds a first threshold, and (ii) such that the first driving voltage generated by the second voltage regulator is selected when the electric power supply capability of the battery is equal to or lower than the first threshold; and a second controller configured to control the second switch (i) such that the second driving voltage generated by the first voltage regulator is selected when the electric power supply capability of the battery exceeds a second threshold which is different from the first threshold, and (ii) such that the second driving voltage generated by the second voltage regulator is selected when the electric power supply capability of the battery is equal to or lower than the second threshold.

2. The apparatus according to claim 1, wherein the first device is a secure element configured to perform authentication processing, and the second device is a memory configured to store data.

3. The electronic apparatus according to claim 1, wherein the electronic circuit wirelessly receives electric power from the external device by using an electromagnetic induction technique.

4. The electronic apparatus according to claim 1, wherein the electronic circuit wirelessly receives electric power from the external device in an electric wave form.

5. The electronic apparatus according to claim 2, wherein the electronic circuit wirelessly receives electric power from the external device by using an electromagnetic induction technique.

6. The electronic apparatus according to claim 2, wherein the electronic circuit wirelessly receives electric power from the external device in an electric wave form.

7. The electronic apparatus according to claim 1, wherein the apparatus is a mobile phone.

8. A method for controlling an electronic apparatus on which a card is mounted, the card including first and second devices which are drivable with different driving voltages, the method comprising:

first generating a first driving voltage for driving the first device of the card and a second driving voltage for driving the second device of the card using electric power from a battery;

second generating the first driving voltage and the second driving voltage using electric power received wirelessly from an external device;

first selecting any one of the first driving voltage generated in the first generating and the first driving voltage generated in the second generating;

second selecting any one of the second driving voltage generated in the first generating and the second driving voltage generated in the second generating;

performing first control (i) such that the first driving voltage generated in the first generating is selected when an electric power supply capability of the battery exceeds a first threshold, and (ii) such that the first driving voltage generated in the second generating is selected when the electric power supply capability of the battery is equal to or lower than the first threshold; and performing second control (i) such that the second driving voltage generated in the first generating is selected when the electric power supply capability of the battery exceeds a second threshold which is different from the first threshold, and (ii) such that the second driving voltage generated in the second generating is selected when the electric power supply capability of the battery is equal to or lower than the second threshold.

* * * * *